United States Patent Office 3,075,001
Patented Jan. 22, 1963

3,075,001
PRODUCTION OF METHYL METHACRYLATE
John J. Godfrey, Silver Spring, Md., assignor to W. R. Grace & Co., New York, N.Y., a corporation of Connecticut
No Drawing. Filed Dec. 22, 1961, Ser. No. 161,429
6 Claims. (Cl. 260—486)

The present invention relates to a novel method for the production of methyl methacrylate, and more specifically to an economical and convenient method for obtaining methyl methacrylate from an inexpensive source material.

Methyl methacrylate is an important unsaturated ester which is used in the production of a variety of polymeric materials. The prior art discloses of several methods by which methyl methacrylate may be derived from a variety of intermediates or raw materials. Often these prior art methods are complex in that they require the use of multiple processing steps and usually more than one reactant or intermediate source material.

Obviously, the conducting of multiple processing steps which use a series of reactants often lead to a final product which is more expensive than one processed in a more simple manner.

It is therefore an object of the present invention to provide a simple one-step reaction process by which methyl methacrylate may be produced.

It is another object to provide a process by which methyl methacrylate may be easily obtained from a single low cost raw material.

These and still further objects of the present invention will become obvious to one skilled in the art from the following detailed description and specific examples.

Broadly the present invention contemplates a method for producing methyl methacrylate which involves the pyrolysis of methyl pivalate (methyl trimethylacetate) under controlled reaction conditions.

More specifically, the present invention involves a method which comprises pyrolyzing methyl pivalate at a temperature at from about 550 to 650° C. under an inert atmosphere, recovering the methyl methacrylate from unreacted pivalate, and preferably recycling the unreacted methyl pivalate to obtain further pyrolytic treatment.

In a preferred embodiment of the present invention methyl pivalate in the vapor phase is conducted through a pyrolysis zone by means of an inert carrier gas such as nitrogen, hydrogen, or any of the rare gases of Group O of the periodic table. The inert carrier gas may constitute practically any portion of the reaction mixture or may be entirely omitted, however, for best results the mixture generally comprises from about 50 to about 90 mole-percent inert gas.

The reaction zone may conveniently be a conventional elongated tube or chamber which is provided with suitable heating means. Reaction chambers fabricated from materials such as stainless steel, quartz, and vycor glass are entirely satisfactory.

The reaction temperature at which the desired pyrolysis occurs is in the range of 550 to 650° C. Temperatures substantially greater than 650° C. tend to induce charring of the methyl pivalate and reduce the yield of methyl methacrylate. On the other hand temperatures less than about 550° C. are not sufficiently high to produce any substantial amount of product.

Subsequent to the pyrolysis step, methyl methacrylate may be recovered from the reaction mixture by conventional gas chromatography, and extractive or azeotropic distillation procedures. Since the boiling points of methyl pivalate and methyl methacrylate are very close, simple distillation does not offer a suitable method for separating these two components. Unchanged methyl pivalate may be recycled through the pyrolysis zone subsequent to separation.

Using temperatures varying from 550 to 650° C., residence time at pyrolyzation temperature varying from as low as about 1 second up to about 10 seconds may be used to obtain varying yields of product. In general, extruding the residence time much above 10 seconds results in excessive degradation of the reactants, whereas a residence time of less than about 1 second does not normally yield worthwhile amounts of product. For example, about 5% of the methyl pivalate initially passed through a pyrolysis zone maintained at 625° C., is converted into methyl methacrylate when a residence time of about 5 seconds in the pyrolysis zone is used, and lowering of the residence time from 5 to 1 second results in a progressive decrease in yield of product.

Having described the basic principles of the present invention the following examples are given to illustrate specific embodiments thereof.

Example I

A gaseous mixture containing 10% by volume of vaporized methyl pivalate and 90% nitrogen was passed through a stainless steel pyrolysis tube maintained at a temperature of 625° C. Residence time of the gaseous mixture in the tube was about 5 seconds. The reaction mixture exiting from the tube was then analyzed by gas liquid chromotography and was found to contain about 5% methyl methacrylate.

Example II

A gaseous mixture containing 20 mole-percent of methyl pivalate in nitrogen was passed through a pyrolysis tube maintained at 575° C. The residence time of the mixture in the tube was 10 seconds. Analysis of the pyrolysate indicated that a 5% conversion had taken place.

The above examples conclusively indicate that methyl methacrylate may be conveniently and economically obtained by pyrolyzing methyl pivalate under certain reaction conditions.

I claim:

1. A method for preparing methyl methacrylate which comprises pyrolyzing methyl pivalate at temperatures of from about 550 to 650° C., and recovering methyl methacrylate from the pyrolysis products.

2. A method for preparing methyl methacrylate which comprises conducting a reaction mixture of methyl pivalate vapor in an inert carrier gas through a pyrolysis zone maintained at a temperature of from about 550° C. to about 650° C., and separating methyl methacrylate from the pyrolyzed reaction mixture.

3. A continuous method for preparing methyl methacrylate which comprises conducting a reaction mixture of methyl pivalate vapor an inert gas through a pyrolysis zone maintained at a temperature at from about 550° to 650° C., separating methyl methacrylate from the pyrolysis reaction mixture, and recycling the unreacted methyl pivalate through said pyrolysis zone.

4. The method of claim 2 wherein the reaction mixture remains in said pyrolysis zone for a period of from about 1 to about 10 seconds.

5. The method of claim 4 wherein the inert gas is selected from the group consisting of nitrogen, hydrogen, argon and helium.

6. The method of claim 5 wherein the reaction mixture contains from about 50 to about 90 mole-percent inert gas.

No references cited.